May 6, 1941.  F. A. WEDBERG  2,241,335

WING FLAP POSITION INDICATOR

Filed Oct. 18, 1939

INVENTOR
FRANK A. WEDBERG.
BY
ATTORNEY

Patented May 6, 1941

2,241,335

UNITED STATES PATENT OFFICE 2,241,335

WING FLAP POSITION INDICATOR

Frank A. Wedberg, Kenmore, N. Y., assignor to Curtiss-Wright Corporation, a corporation of Delaware Application October 18, 1939, Serial No. 299,938

7 Claims. (Cl. 244—1)

This invention relates to aircraft control systems and more particularly to means for indicating the relative positions of control and other movable surfaces.

The present invention has for one of its principal objects the provision of novel means for indicating to the pilot the relative position of the upper and lower portions of a split trailing edge flap. Flaps of this type are well known and normally function to increase wing lift and drag for take-off and landing conditions. Split trailing edge flaps of the spreadable type such as are shown and described in Patent No. 2,137,382 issued to R. C. Blaylock et al. on Nov. 22, 1938, are also capable of use as an aerodynamic brake to reduce the speed of the aircraft in a dive and for certain other maneuvers.

Normally the lower flap on the lower wing of a biplane, or on a low wing monoplane, is not visible to the pilot, and it is accordingly an object of this invention to provide a device whereby the pilot can accurately determine the angle to which the lower flap is extending. It is a further object to provide a simple indicating device directly at the flap such that it is exposed in the high drag and high lift attitude of the flap and is substantially fully retracted within the wing in the normal or high speed condition of the flap when a reading of the angle is not required and the attendant higher drag of the device would not be desirable.

Other objects will be apparent to one skilled in the art from a reading of the accompanying specification and from an examination of the attached drawing, forming a part hereof, in which similar numbers indicate like parts, and in which.

Figure 1:
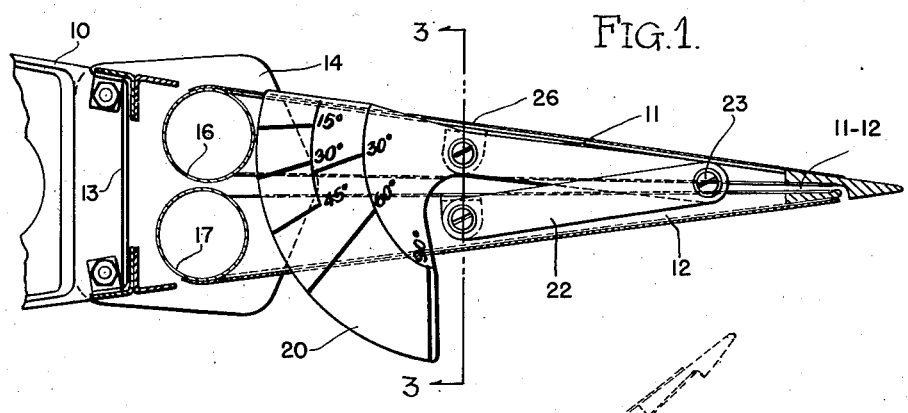
Fig. 1 is a cross-sectional elevation of the trailing portion of a wing showing the split trailing edge flap portions of the spreadable type in their aligned close relationship.
Figure 2:
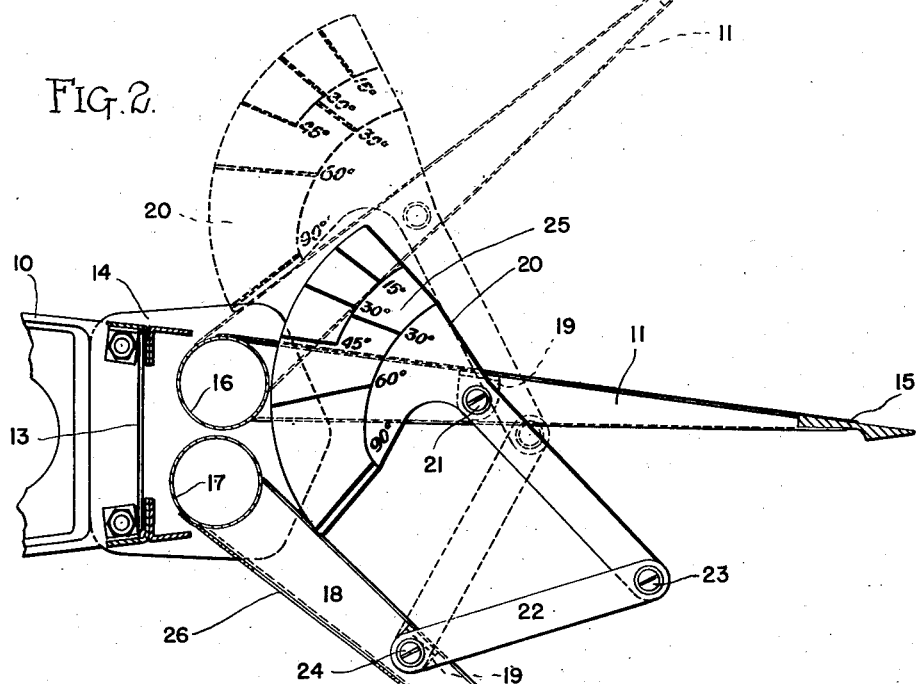
Fig. 2 shows a similar elevation of the same flap portions in two of their separated relationships.
Figure 3:
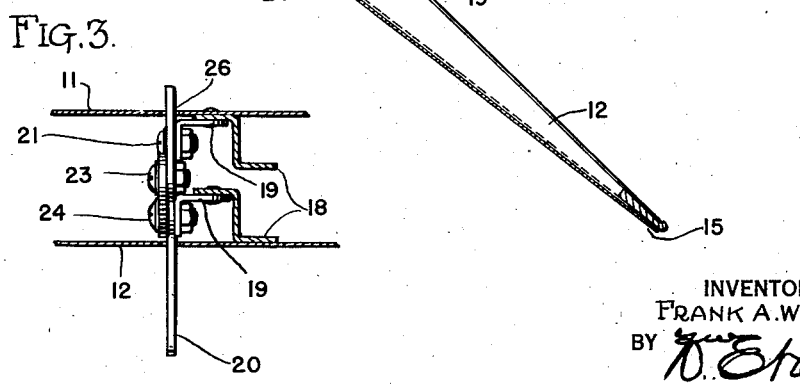
Fig. 3 is a section taken at 3—3 in Fig. 1.

Referring to Figs. 1 and 2 the wing 10 is provided at its trailing edge with a split flap unit 11—12 which is pivotally mounted upon the flap-supporting structure comprising the trailing edge spar 13 and the spanwise spaced brackets 14. The flap unit 11—12 comprises two complementary flaps nested together in their normal position, as shown in Fig. 1, to form a trailing edge of the wing 10 in continuation with its basic profile. Each of the flap portions 11 and 12 are comprised of tapered sections covered with a thin sheet or skin 15 and cantilevered from the tubes 16 and 17 upon which the sections are hinged for rotation.

The lower flap 12 may be lowered separately as in the full line position of Fig. 2; or both sections may be separated, or rotated oppositely into outward positions, as in the dotted line position of Fig. 2. The aerodynamic effect of these various positions, and the control mechanism for obtaining them, are well known to those skilled in the art, and are not shown or described herein for this reason. The aforementioned Blaylock et al. patent is referred to for a preferred arrangement and operation of such flaps but the present invention is by no means limited to the arrangements shown and described therein.

The tapered flap sections are each provided with ribs 18 of Z or other suitable cross-section which are attached to the tubes 16 and 17 and to which in turn the skin 15 is fastened. Apertured angle brackets 19 are fastened to the upper flanges of a set of the ribs. An indicator member 20 is preferably formed of a metallic sheet having a sector-shaped portion at one end and a lever portion at its opposed end and is intermediately mounted for pivotation about the axis of the pivot bolt 21 engaging the aperture in the upper bracket 19. The lever portion of member 20 is apertured at its extremity and pivotally engages link 22 by means of the pivot bolt 23. The link 22 is similarly pivoted to the bracket 19 on the lower flap by the pivot bolt 24, the distance between the axes 21 and 23 preferably being equal to the distance between the axes 24 and 23.

The indicator portion of member 20 is provided with indicia 25 comprising a scale formed of concentric and tangential lines marked off in degrees. The scale starts from the zero position as shown in Fig. 1 where there is no divergence of the flap sections and the end of the indicator at the zero reading projects slightly above the skin surface 15 of the upper flap which is provided with a slotted opening 26 to permit passage of the indicator therethrough. The linkage 21 and 22 and the scale indicia 25 is such that any angular divergence of either flap section above or below its normal position will be indicated by the reading on the indicator scale where it intersects the surface 15 of the upper flap section. For example, in Fig. 2 in the full line positions wherein the upper flap 11 is in normal position and the lower flap 12 has been lowered, the intersection appears substantially at 45 degrees, indicating to the pilot that the lower flap has been dropped through this angle. The lower flap also has an opening 26.

In Fig. 2 in the dotted line position wherein each flap section has been rotated oppositely 45 degrees above and below its normal position, it can be seen from the scale intersecting the upper surface of the raised flap 11 that a total angle of 90 degrees is subtended by the divided flap sections. It will be noted that due to the separate and spaced axes of rotation of each flap section and the effect upon the paths passed through by the pivot axis 23, the scale for the outer 45 degree angle has been separately calibrated. This outer 45 degree scale is used when the lower flap only is extended in which case the indicator extends beyond the upper flap a lesser amount than when the flap sections are rotated equally and oppositely with the same total divergence of 45 degrees. In the latter case the inner scale graduated to 30, 60 and 90 degrees would be used to indicate the total divergence. It will be obvious upon examination of the five sided figures determined by the five hinge or pivot axes that the exterior angle, which is actually the exposed indicator portion 20, is greater in the symmetrical arrangement of the five sided figure when the flap sections are equally and oppositely rotated.

It will be apparent to those skilled in the art that the present invention disclosed herein in a preferred embodiment is equally applicable for use in conjunction with conventional trailing edge ailerons and flaps, rudders, elevators or split trailing edge flaps of the type wherein the flap is disposed beneath a fixed trailing portion of the wing. In each of these instances the indicating segment would project through the fixed wing or airfoil portion as the movable surface is rotated away from its normally alined position. It will also be obvious that my invention is equally capable of use for indicating the magnitude of relative displacements of leading edge vanes and spoilers with respect to the fixed airfoils with which they are associated. It will be understood that these changes and modifications are considered to come within the spirit and scope of the present invention as set forth in the following claims.

I claim as my invention:

1. In aircraft, an airfoil, a split flap comprising upper and lower complementary sections forming the trailing portion of said airfoil, said flap sections being pivotally mounted upon said trailing portion for movement into operating positions, an indicating link pivotally mounted intermediate its length to one of said sections, a second link pivoted to the other of said sections and to a terminal of said indicating link, and indicia on the remaining terminal of the indicating link adapted to project through the outer surface of said airfoil upon separating movement of said sections to indicate the extent of said movement.

2. In aircraft, an airfoil, a split flap comprising upper and lower complementary sections forming the trailing portion of said airfoil, said flap sections being pivotally mounted upon said trailing portion for movement into operating positions, operating means for individual movement of said lower section and joint outward movement of both sections, an indicating link pivotally mounted intermediate its length upon one of said sections, a second link pivoted to the other of said sections and to a terminal of said indicating link, and at least two indicating scales on the remaining terminal of the indicating link adapted to project through the outer surface of said airfoil trailing portion upon relative outward movements to indicate on one of said scales the extent of individual movement of said lower section, and on the other of said scales the joint movement of both sections, respectively.

3. In a flap installation for aircraft, complementary upper and lower flap sections, spaced pivots about which said sections are adapted to be rotated for separating movements, indicating means carried solely by said sections comprising at least two members separately pivoted to each flap section and to each other, indicia associated with one of said members adapted to be rotated oppositely to and to be projected beyond the surface of one of said sections upon separating movement of said sections.

4. In a flap installation for aircraft, complementary upper and lower flap sections, spaced pivots about which said sections are adapted to be rotated for independent and joint separating movements, indicating means carried entirely by said sections comprising at least two members separately pivoted to each flap section and to each other, sets of indicia associated with one of said members adapted to be rotated oppositely to and to be projected beyond the surface of one of said sections upon said independent and joint separating movements respectively.

5. In aircraft, a wing, split trailing edge flaps pivoted thereto for independent and joint outward movements with respect to said wing, means for indicating the relative outward positions of said flaps comprising an indicator member pivoted intermediate its ends to one of said flaps, a link pivoted to the other of said flaps and to an adjacent end of said member, indicia markings upon the other end of said member, the outer surfaces of said flaps being provided with openings through which the indicia end of said member is adapted to be passed upon operation of said flaps to visibly indicate to an operator the extent of said movements, the said pivotal connection of said member to said link being disposed rearwardly with respect to the pivotal connections of the link and member to the flaps whereby in the closed position the indicia end is disposed between the last said pivotal connections and the pivotal connections by which the flaps are hinged to the wing.

6. In aircraft, an airfoil, a split trailing portion of said airfoil comprising upper and lower members movably mounted upon said airfoil normally extending rearwardly to form a continuation thereof, and means to indicate the relative movement of said members with respect to each other comprising an indicating element pivotally mounted intermediate its terminals upon one of said members, indicia markings carried by one terminal and a pivotal connection on the opposed terminal of said element, a link element pivotally mounted upon the other of said movable members and pivotally engaging said pivotal connection of the said indicating element, whereby outward movement of said members is transmitted by said link to said indicator element initiating corresponding movement of its indicating terminal with respect to the exterior surface of the member upon which it is pivoted.

7. In aircraft, an airfoil, a split trailing portion comprising upper and lower members hingedly mounted upon said airfoil and normally extending rearwardly to form the aligned trailing edge thereof, and means carried solely by said members to indicate the relative movement therebetween comprising an indicating element pivotally mounted intermediate its terminals upon one of said members, indicia markings carried upon one said terminal and a pivotal connection on the opposed terminal of said element, a link element pivotally mounted upon the other of said movable elements and pivotally engaging said pivotal connection of the said indicating element whereby outward movement of said members is transmitted by said link to said indicator element initiating opposite rotational movement of said indicator element with respect to the outward movement of the member upon which it is pivoted.

FRANK A. WEDBERG.